United States Patent [19]
Perez

[11] Patent Number: 4,984,506
[45] Date of Patent: Jan. 15, 1991

[54] BRAKE BOOSTER WITH ADJUSTABLE JUMP

[75] Inventor: Miguel Perez, Argenteuil, France
[73] Assignee: Bendix France, Drancy, France
[21] Appl. No.: 342,770
[22] Filed: Apr. 24, 1989
[30] Foreign Application Priority Data
Apr. 28, 1988 [FR] France .................. 88 05654
[51] Int. Cl.⁵ .................................. F15B 13/16
[52] U.S. Cl. .................... 91/369.2; 91/376 R
[58] Field of Search ............... 91/369.2, 376 R, 369.4
[56] References Cited
U.S. PATENT DOCUMENTS
4,586,427 5/1986 Thiel .................. 91/369.2
4,729,285 3/1978 Harrison ............... 91/369 A FOREIGN PATENT DOCUMENTS
0004477 10/1979 European Pat. Off. .
0159148 10/1985 European Pat. Off. .
0252267 1/1988 European Pat. Off. .
0202146 11/1983 Japan .................. 91/369.2

Primary Examiner—William E. Wayner
Attorney, Agent, or Firm—Larry J. Palguta; Ken C. Decker

[57] ABSTRACT

In a brake booster comprising a control rod (30) actuating a booster mechanism (34, 20a, 28a) by way of a plunger (28), in order to exert a boosting force on a piston (20) acting on a push rod (46) via a reaction disc (48) made of a deformable material, an adjustable prestress is applied to the latter. This result can be obtained particularly by way of a cover (50) capping a plate (46b), formed at the rear end of the push rod, and the reaction disc (48). The prestress thus applied to the disc makes it possible to adjust the play existing between the latter and the front end of the plunger (28) and consequently the jump of the booster.

3 Claims, 2 Drawing Sheets

BRAKE BOOSTER WITH ADJUSTABLE JUMP

DESCRIPTION

The invention relates to a brake booster and advantageously applies to all motor vehicles, the brake circuit of which is equipped with such a booster. A brake booster generally comprises a control rod which moves forwards when the vehicle driver actuates the brake pedal. This movement of the control rod is transmitted to a plunger which actuates booster means. In general, these booster means comprise a three-way valve, the actuation of which makes it possible to break the communication between a front chamber and a rear chamber of the booster and to connect the latter chamber to the atmosphere. Because the front chamber is normally under a vacuum, a boosting force is thus exerted on the piston separating the two chambers. The piston then moves forwards, at the same time acting on a push rod serving to actuate the master cylinder of the brake circuit.

Conventionally, the piston serving to transmit the boosting force to the push rod acts on the latter via a reaction disc made of a deformable material, such as an elastomer. At rest, a slight play exists between the front end of the plunger and the reaction disc. When the vehicle driver begins to actuate the brake pedal, this slight play allows the plunger to move forwards immediately in order to control the booster means and ensure the brakes respond immediately.

The effect of transmitting the boosting force exerted on the piston to the push rod via the reaction disc is to compress the peripheral part of the reaction disc axially in proportion to the boosting force. This compression of the peripheral part of the reaction disc results in a deformation of the central part of this disc towards the front face of the plunger. When the boosting force exceeds a certain threshold, the play initially existing at rest between the reaction disc and the front face of the plunger is compensated, so that the plunger is in contact with the reaction disc and the latter transmits back towards the brake pedal a reaction force representing the brake force exerted on the vehicle brakes. This well-known arrangement enables the driver to meter the brake force which he exerts on the pedal, as a function of the resistance which he encounters and which increases with this force.

It emerges from the foregoing explanation that the reaction on the pedal begins to appear only when the boosting force generated as a result of the actuation of the brake pedal exceeds a certain threshold. This threshold is called the "jump" of the booster. It is an important feature of the booster. In fact, although it is necessary for a jump to exist to ensure an immediate response of the brakes during an actuation of the pedal, motor-vehicle manufacturers usually want the value of this jump to remain within certain limits, so that the boost does not reach too high a value without an increase in the reaction on the pedal.

However, particularly because of the production tolerances of the various component parts of the booster, there may be considerable differences in the value of the jump from one booster to another. Furthermore, at the present time there is no means for controlling or adjusting the value of this jump, and therefore the requirements mentioned above are not always met.

The specific subject of the present invention is an improved brake booster, in which the value of the jump can be adjusted, without the cost of the booster being greatly increased thereby.

According to the invention, this result is obtained by means of a brake booster comprising an outer casing of given axis, in which are mounted movably in said axis a hollow booster piston, a control rod carrying a plunger accommodated in the piston, and a push rod, booster means accommodated in said casing being controlled as a result of a forward movement of the plunger and having the effect of moving the piston forwards, a reaction disc made of a deformable material being interposed between an annular front face of the piston and a rear face of the push rod, in such a way that a play is normally formed, at rest, between a front face of the plunger and this reaction disc, characterized in that a means is provided for applying an adjustable prestress to the reaction disc between the annular front face of the piston and the rear face of the push rod, so as to adjust said play.

According to a special embodiment of the invention, said means comprises a cover screwed onto the piston around the annular front face of the latter, this cover capping a plate, formed on the push rod and comprising the rear face of the latter, and the reaction disc.

The invention will now be described by way of example with reference to the accompanying drawings in which:

FIG. 1 shows part of a brake booster intended to be arranged in the conventional way between the brake pedal of a vehicle and the master cylinder controlling the hydraulic brake circuit of this vehicle. By convention, the part of the booster facing the master cylinder is called its front part, and the part of the booster facing the brake pedal is called its rear part.

Figure 1:
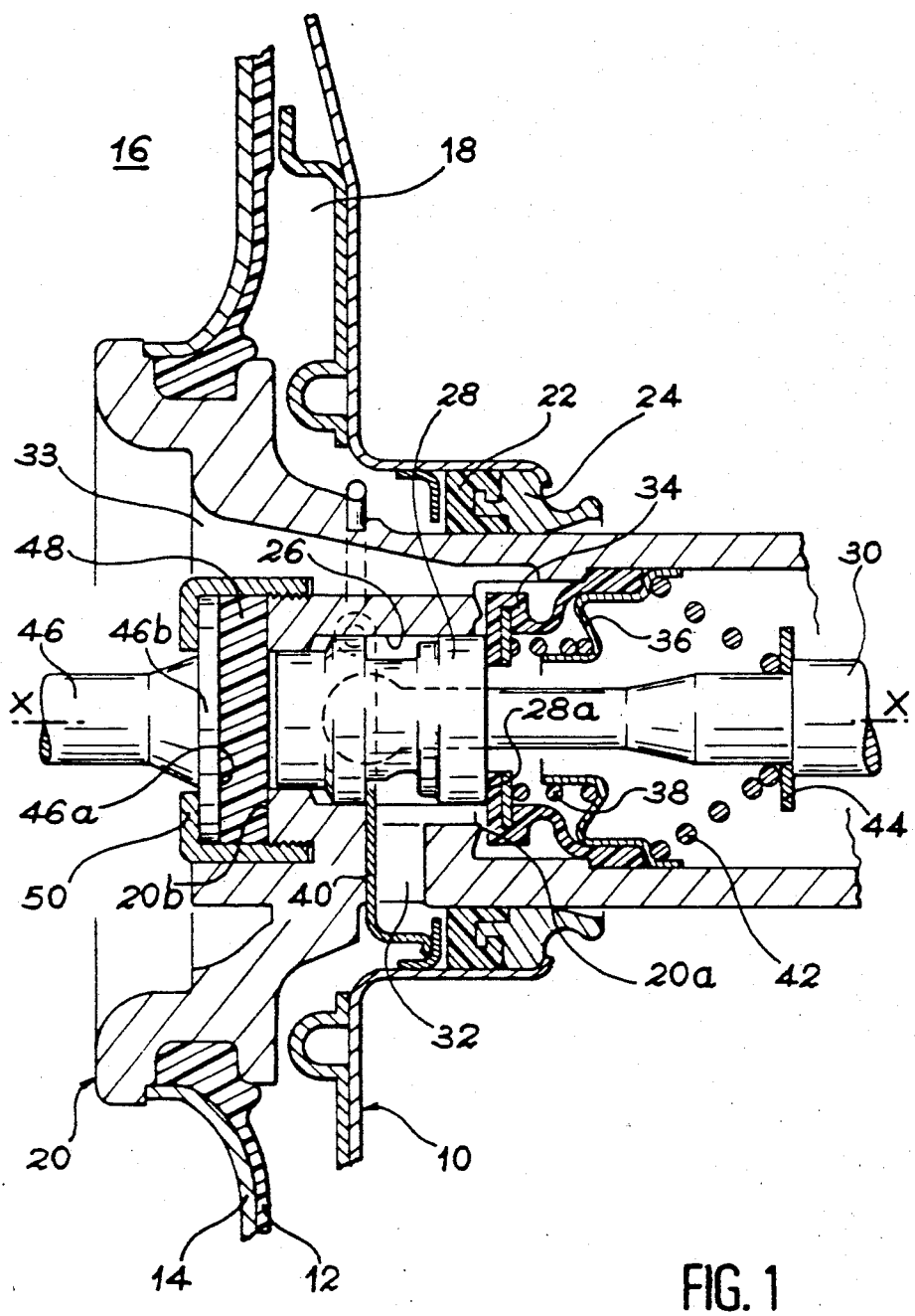
FIG. 1 is a side view in longitudinal section, showing the central part of a brake booster equipped with jump adjustment means according to the invention.

The booster of FIG. 1 comprises a shell-shaped outer casing 10 having a symmetry of revolution about an axis X—X. Only the rear central part of this casing 10 is shown in FIG. 1.

A flexible elastomeric diaphragm 12, reinforced in its central part by a metal supporting disc 14, defines within the space delimited by the casing 10 a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow booster piston 20 arranged in the axis X—X of the booster. This hollow piston 20 is extended rearwards in the form of a tubular part which passes sealingly through the rear wall of the casing 10. The sealing of this passage is ensured by means of a reinforced annular gasket 22 which is fastened, by means of a ring 24, in a tubular central part extending the rear wall of the casing 10 rearwards.

A compression spring (not shown) interposed between the piston 20 and the front wall (not shown) of the outer casing 10 normally keeps the piston in a rear rest position, illustrated in FIG. 1, in which the rear chamber 18 has its minimum volume and the front chamber 16 its maximum volume.

The piston 20, in its central part located between the tubular rear part and the front part in which the diaphragm 12 is fastened, has a stepped bore 26, in which a plunger 28 likewise having a symmetry of revolution about the axis X—X is received slideably. The front end of a control rod 30 of the booster, likewise arranged in the axis X—X, is mounted ball-pivotably in the plunger 28. The rear end (not shown) of this rod 30, which projects outside the tubular part of the piston 20, is controlled directly by the brake pedal of the vehicle.

The annular space delimited between the control rod 30 and the tubular part of the piston 20 opens outwardly at the rear of the booster. Towards the front, this same annular space can communicate with the rear chamber 18 via a radial passage 32 formed in the central part of the piston, when booster means controlled by the plunger 28 are actuated.

Conventionally, these booster means comprise a three-way valve having an annular shutter 34, mounted in the tubular part of the piston, and two annular valve seats 20a and 28a formed respectively on the central part of the piston 20 and on the plunger 28.

The shutter 34 forms the front end, of smaller diameter, of a flexible elastomeric sleeve, the rear end of which terminates in a bead mounted sealingly inside the tubular part of the piston 20. This bead is maintained in place by means of a metal cup 36, on which bears a compression spring 38 tending to move the shutter 34 forwards.

The annular valve seat 28a is formed on the rear end face of the plunger 28. In a comparable way, the annular valve seat 20a is formed on the rear end face of the central part of the piston 20 around the seat 28a. According to the position of the plunger 28 within the piston 20, this arrangement allows the shutter 34 constantly to be sealingly up against at least one of the valve seats 28a and 20a under the action of the spring 38.

A second passage 33 is formed in the central part of the piston 20, approximately parallel to its axis X—X, to put the front chamber 16 of the booster in communication with an annular chamber formed around the shutter 34, within the tubular part of the piston. When the plunger 28 occupies its rear rest position, illustrated in FIG. 1, in which the shutter 34 is sealingly up against the seat 28a of the plunger and set apart from the seat 20a of the piston, the front and rear chambers 16 and 18 of the booster thus communicate with one another via the passages 33 and 32.

In a manner known per se, at least one stop member 40 mounted in the central part of the piston 20 delimits the axial stroke of the plunger 28 within the latter. The plunger 28 is normally maintained in the rear rest position defined by the member 40 by means of a compression spring 42 interposed between the cup 36 and a washer 44, itself up against a shoulder formed on the control rod 30.

The piston 20, in its central part, comprises annular front face 20b, at the center of which the bore 26 opens out. This annular front face 20b of the piston 20 acts on a rear face 46a of a push rod 46 via a reaction disc 48 made of a deformable material, such as an elastomer. More specifically, the push rod 46 and the reaction disc 48 are arranged in the axis X—X of the booster, in the extension of the control rod 30 and of the plunger 28.

Figure 2:
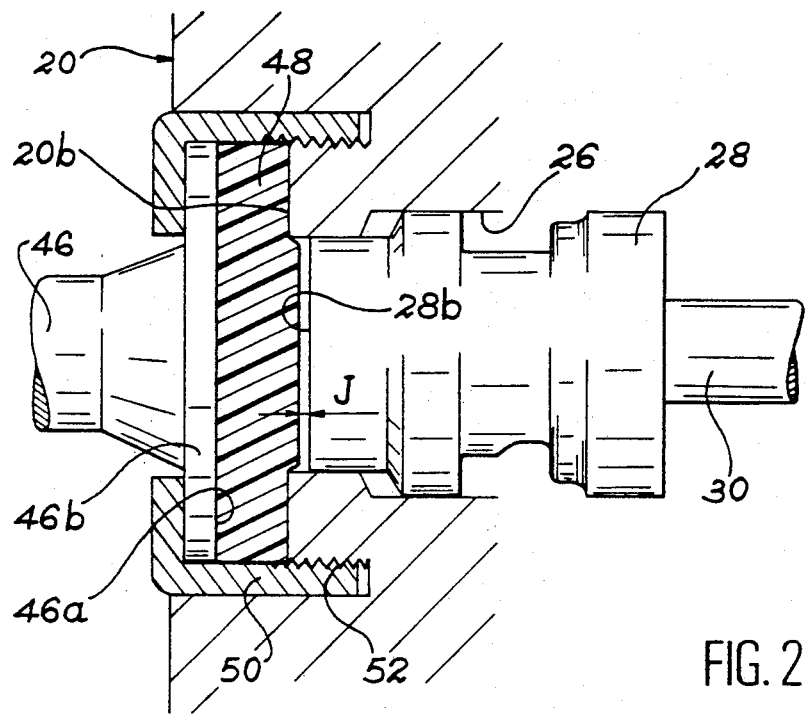
FIG. 2 is a view in longitudinal section, showing on a larger scale the mounting of the reaction disc on the piston of the booster according to the invention.

As illustrated more clearly in FIG. 2, the rear surface 46a of the push rod 46 is formed on a disc-shaped plate 46b which forms the rear end of the rod 46.

According to the invention, the plate 46b and the reaction disc 48 are capped by a cover 50 centered on the axis X—X of the booster and screwed onto a thread 52 formed on an annular shaped, axial slot of the central part of the piston around the annular front face 20b of the latter.

This arrangement makes it possible, by screwing the cover 50 onto the thread 52 to a greater or lesser extent, to apply adjustable prestress to the peripheral part of the reaction disc 48 between the mutually confronting faces 20b and 46a of the piston and of the push rod.

As illustrated in FIG. 2, depending on the amount of prestress thus exerted on the peripheral part of the reaction disc 48, the central part of the latter is deformed to a greater or lesser extent towards the front face 28b of the plunger 28. It is thus possible to adjust accurately the play J existing between this front face 28b of the plunger and the reaction disc 48.

If FE denotes the force applied to the control rod 30 at the inlet of the booster and FS designates the force applied by the push rod 46 at the outlet of the booster, the functioning of the latter will now be described with reference to the curve of FIG. 3.

When the booster is installed on a vehicle, the front chamber 16 communicates permanently with a vacuum source.

In a first phase, the effect of the actuation of the brake pedal by the driver is to compensate the idle stroke initially existing between the shutter 34 and the valve seat 20a formed on the piston 20. The front and rear chambers 16 and 18 of the booster are then isolated from one another. In this first phase of the actuation of the booster, corresponding to the segment OA in FIG. 3, the force exerted on the control rod 30 does not generate any force on the push rod 46 at the outlet of the booster.

Figure 3:
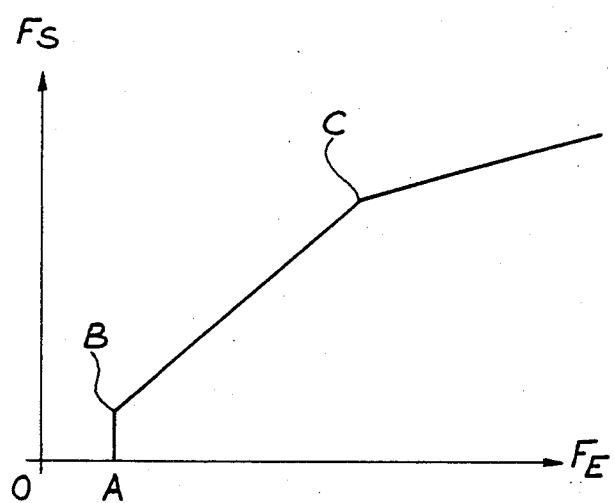
FIG. 3 is a curve diagrammatically representing the change of the force FS exerted on the push rod at the outlet of the booster as a function of the force FE exerted on the control rod at the inlet of the booster.

In a second phase of the actuation of the brake, corresponding to the segment AB in FIG. 3, the plunger 28 is moved sufficiently forwards for the shutter 34 to be in sealing contact with the seat 20a of the piston and at a distance from the seat 28a of the plunger. Under these conditions, the rear chamber 18 of the booster is isolated from the front chamber 16 and communicates with the atmosphere. A boosting force is therefore generated, which tends to move the piston 20 forwards. This movement is transmitted to the push rod 46 by the reaction disc 48.

During this second phase of the actuation of the brakes, the boosting force exerted by the piston 20 does not deform the reaction disc 48 sufficiently for the latter to fill completely the space corresponding to the play J separating it initially from the plunger 28. Consequently, the outlet force FS applied to the master cylinder by the push rod 46 increases abruptly to the value corresponding to the point B in FIG. 3, while the force exerted on the control rod 30 remains unchanged.

The point B in FIG. 3 corresponds to the threshold, at which the boosting force generated in the booster and exerted on the reaction disc 48 by the piston 20 becomes sufficient for the central part of the reaction disc to come in contact with the front face 28b of the plunger 28, that is to say when the play J is compensated. The length of the segment AB corresponds to the jump of the booster. According to the invention, it is possible to control and adjust this jump by screwing the cover 50 to a greater or lesser extent, in order to give the play J the desired value.

In a third phase of the actuation of the brake, corresponding to the segment BC in FIG. 3, any increase in the force exerted on the control rod 30 by the driver generates an increase in the boosting force exerted on the piston, which results in an increase in the reaction on the pedal exerted by the disc 48 on the plunger 28, then in contact with one another.

Beyond the point C in FIG. 3, the pressure prevailing in the rear chamber 18 of the booster is equal to the atmospheric pressure, and an increase in the boosting pressure is no longer possible. The increase in the outlet force exerted on the master cylinder by the push rod 46 is then substantially equal to the increase in the force exerted on the brake pedal by the driver.

It should be noted that the curve of FIG. 3 is conventional per se and has been explained here only in order to make it easier to understand the advantages afforded by the invention.

Of course, the invention is not limited to the embodiment just described by way of example, but embraces all its variants. Thus, it will easily be understood that the invention applies to all existing brake boosters, whatever their particular structure. Furthermore, the cover 50 which, in the embodiment described, makes it possible to adjust the prestress applied to the peripheral part of the reaction disc can be replaced by any member allowing such an adjustment to be made, particularly by a plate screwed onto the front face of the piston 20, in such a way that the spacing between this plate and the piston is adjustable.

We claim:

1. A brake booster comprising an outer casing having an axis, in which is mounted movably on said axis a hollow booster piston, a control rod carrying a plunger accommodated in the piston, a push rod, booster means accommodated in said casing and being controlled as a result of a forward movement of the plunger and having the effect of moving the piston forwards, a reaction disc made of a deformable material being interposed between an annular front face of the piston and a rear face of the push rod, in such a way that a play is normally formed, at rest, between a front face of the plunger and said reaction disc, and means for applying an adjustable prestress to the reaction disk between the annular front face of the piston and the rear face of the push rod so as to adjust said play, wherein said means comprises a cover screwed onto the piston around the annular front face of the piston, said cover capping a plate and the reaction disc, the plate formed on the push rod and comprising the rear face of said push rod.

2. The booster in accordance with claim 1, wherein the cover includes a central opening through which extends said push rod.

3. The booster in accordance with claim 2, wherein the cover is received within an annular shaped, axially extending slot in the piston.

* * * * *